Jan. 9, 1934.   C. Q. McW. CAMPBELL   1,942,507
PROCESS FOR THE PREPARATION OF SOLS FOR CLARIFYING LIQUIDS
Filed May 6, 1930
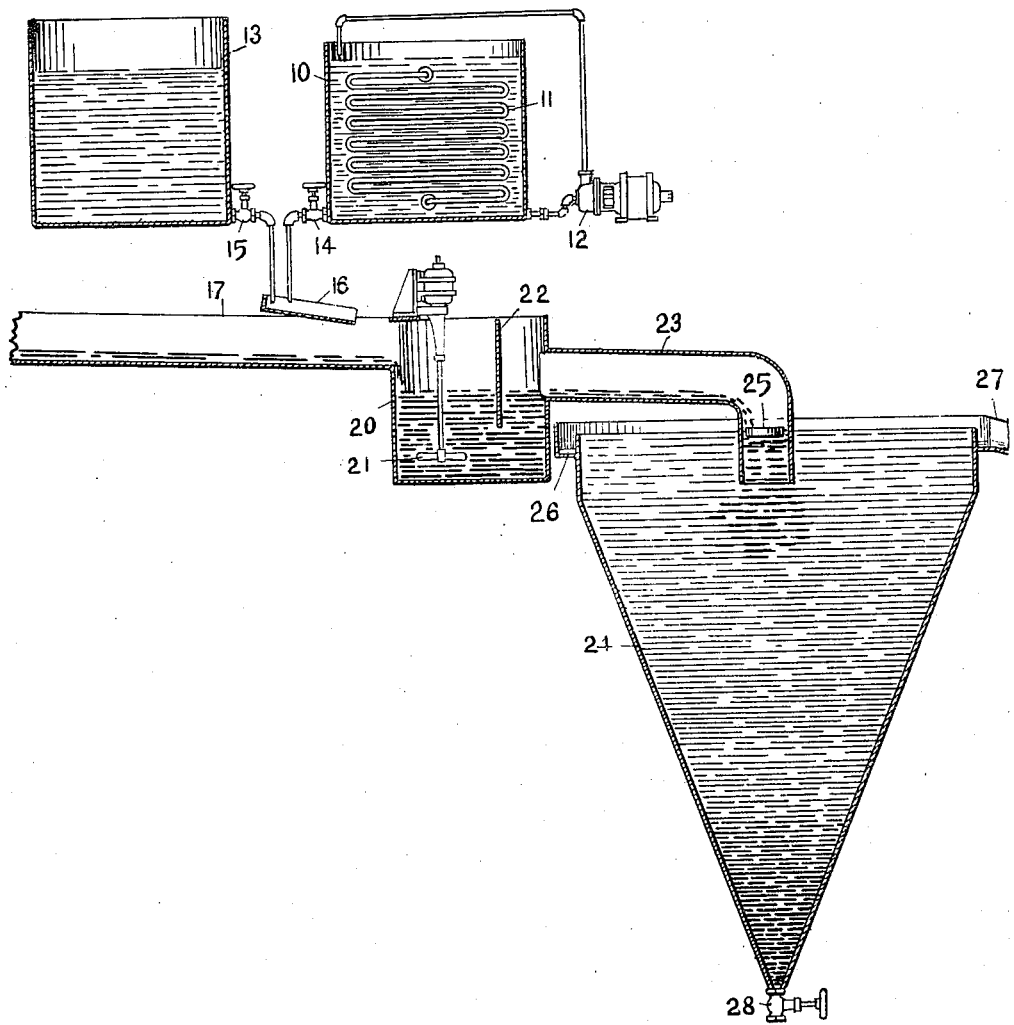
Curtis Quincy McWilliams Campbell
By Samuel W. Balch
Attorney.

Patented Jan. 9, 1934

1,942,507

UNITED STATES PATENT OFFICE 1,942,507

PROCESS FOR THE PREPARATION OF SOLS FOR CLARIFYING LIQUIDS

Curtis Quincy McWilliams Campbell, Shamokin, Pa.

Application May 6, 1930. Serial No. 450,303

11 Claims. (Cl. 252—6)

The object of this invention is to provide a more effective sol or coagulant for effecting the concentration and separation of substances such as fine coal, clay, flue dust, or other materials in suspension in wash waters, or other waters or liquids containing solid matters which are carried in suspension or emulsion, such as still waste, waters from cleaning plants of all kinds, ore-reduction plants, wool scouring plants, sewage and the like.

In carrying out this invention a heavy aqueous mixture, ten-percentum, more or less, of amylaceous materials, as corn or wheat starch, while agitated, is heated to a temperature sufficient to effect a maximum distension of the starch cells without bursting them. To effect this and avoid subjecting any of the grains to a too high temperature the heat is applied gradually until a temperature of substantially forty to fifty degrees centigrade is reached and the mixture is preferably held at this temperature for from fifteen to twenty minutes. Subsequent steps may be at room temperature. The mixture is next preferably diluted to reduce the starch to one-percentum, more or less. Instead, the dilute solution may be made and heated in the first instance.

As required for use, this mixture is fed together with an alkaline reagent, as a three percentum, more or less, solution of sodium hydroxid, or other alkali, to the water which is to be clarified of fine suspended solids. Potassium hydroxid, or even ammonia of proper strength may be used with or in place of sodium hydroxid. Usually about three parts of amylaceous mixture or solution and four parts of alkaline reagent will be required for two thousand parts of water which contains five to eight percent of fine coal or other substances in suspension, but the proportion may be widely varied according to the amount and character of the solids to be separated and the speed at which it is desired to effect their coagulation and separation.

In the accompanying sheet of drawings which forms a part of this description, the figure shows in elevation one form of apparatus for carrying out this process.

A tank 10 is filled with water to which approximately one per centum or more of starch is added. In the tank are steam coils 11 by which the temperature is raised. A circulating pump 12 draws the mixture from the bottom and returns it to the top, thereby insuring an even distribution of the starch through the water and a slow and uniform raising of the temperature.

A second tank 13 contains the alkaline reagent. Through a valve 14 in a pipe leading from the bottom of the tank of amylaceous material, and a valve 15 in a pipe leading from the bottom of the tank of alkaline reagent the two solutions are simultaneously drawn and their flow regulated to a trough 16 where they mix and from which they discharge into a trough 17 through which the water to be clarified is received as from a launder.

Thence the water with the added coagulant passes to a mixing tank 20 in which is a motor-driven agitator 21 and a baffle plate 22. From the mixing tank the water is conducted through a trough 23 to a settling tank or cone 24. The flow from the trough impinges against a float 25 which prevents the flow from unduly agitating the water in the cone. The water from which the impurities have settled flows over the top rim of the cone into a skirt 26 and from the skirt through a spout 27. The settled sludge is drawn from the cone through a valve 28 at the bottom.

I claim,—

1. The process for the preparation of sols for the concentration of substances in suspension or in emulsion in water, which consists in mixing amylaceous materials with water, agitating to prevent their separation and raising the temperature to substantially fifty degrees centigrade for a sufficient time to expand the cells of the amylaceous materials, and combining with an alkaline reagent.

2. The process of preparing a coagulant, which comprises mixing amylaceous material with water, heating the mixture to expand the starch cells substantially without rupturing them, and combining the mixture with an alkaline reagent.

3. The process of preparing a coagulant for the concentration of substances in suspension or in emulsion in water, which comprises mixing amylaceous material with water, heating the mixture to a temperature approximating 40° to 50° C., and combining the mixture with an alkaline reagent.

4. The process of preparing a coagulative sol, which comprises mixing starch with water to form a suspension containing approximately 10% starch by weight, heating the mixture to expand the starch cells substantially without rupturing them, diluting the mixture, and combining the mixture with an alkaline reagent.

5. The process of preparing a coagulative sol, which comprises heating a heavy suspension of starch in water to expand the starch cells substantially without rupturing them, adding water to dilute the suspension to a starch content of approximately 1% by weight, and combining the diluted mixture with an alkaline reagent.

6. The process of preparing a coagulant, which comprises mixing starch with water to form a suspension containing approximately 1% starch by weight, heating the suspension to expand the starch cells substantially without rupturing them, and combining the suspension with an aqueous solution containing approximately 3% sodium hydroxide.

7. The process of preparing a coagulative sol, which comprises mixing starch with water to form a suspension containing approximately 1% starch by weight, heating the suspension to expand the starch cells substantially without rupturing them, and combining approximately 3 parts of the suspension with approximately 4 parts of an aqueous solution containing approximately 3% sodium hydroxide.

8. A coagulant comprising a combination of preheated starch with expanded but substantially unruptured cells in aqueous suspension and an alkaline solution.

9. A coagulative sol for the concentration of substances in suspension or in emulsion in water, which comprises a combination of an aqueous suspension containing approximately 1 per cent starch with cells expanded but unruptured by heating and a solution of sodium hydroxide.

10. The process of preparing a coagulative sol, which comprises heating a heavy suspension of starch in water to expand the starch cells substantially without rupturing them, adding water to dilute and cool the suspension, and then combining the cooled dilute suspension with an alkaline reagent.

11. The process of preparing a coagulative sol, which comprises heating a suspension of starch in water to expand starch cells substantially without rupturing them, cooling the suspension, and combining the suspension with an alkaline reagent at substantially room temperature.

CURTIS QUINCY McWILLIAMS CAMPBELL.